US008543463B2

(12) United States Patent
Zakas et al.

(10) Patent No.: US 8,543,463 B2
(45) Date of Patent: Sep. 24, 2013

(54) SYSTEM AND METHOD FOR INTERACTIVE SHOPPING

(75) Inventors: Dennis Louis Zakas, Atlanta, GA (US);
Kevin Martin Hayes, Atlanta, GA (US);
Tamara Peress Watkins, Palm Beach, FL (US)

(73) Assignee: ZInc., Atlanta, GA (US)

( * ) Notice: Subject to any disclaimer, the term of this patent is extended or adjusted under 35 U.S.C. 154(b) by 555 days.

(21) Appl. No.: 12/502,818

(22) Filed: Jul. 14, 2009

(65) Prior Publication Data

US 2011/0016023 A1  Jan. 20, 2011

(51) Int. Cl.
*G06Q 30/00* (2012.01)

(52) U.S. Cl.
USPC ........................................ 705/26.1; 705/27.1

(58) Field of Classification Search
USPC ..................................................... 705/26, 27
See application file for complete search history.

(56) References Cited

U.S. PATENT DOCUMENTS

| | | | |
|---|---|---|---|
| 7,058,598 B1 | 6/2006 | Chen et al. | |
| 7,072,858 B1 | 7/2006 | Litzow et al. | |
| 7,103,566 B2 | 9/2006 | Silva et al. | |
| 7,133,841 B1 | 11/2006 | Wurman et al. | |
| 7,356,490 B1 * | 4/2008 | Jacobi et al. | 705/26.8 |
| 7,424,445 B1 | 9/2008 | Cue et al. | |
| 7,433,832 B1 * | 10/2008 | Bezos et al. | 705/26.8 |
| 7,580,861 B1 * | 8/2009 | Song | 705/26.35 |
| 7,624,051 B2 | 11/2009 | Gellman | |
| 7,637,426 B1 | 12/2009 | Green | |
| 7,672,875 B2 | 3/2010 | Keohane et al. | |
| 7,739,204 B1 | 6/2010 | Cranner et al. | |
| 7,827,056 B2 | 11/2010 | Walker et al. | |
| 7,881,979 B2 * | 2/2011 | Shaer | 705/27.1 |
| 7,881,984 B2 | 2/2011 | Kane et al. | |
| 7,885,838 B2 | 2/2011 | Sobalvarro et al. | |
| 7,899,710 B1 | 3/2011 | Walker et al. | |
| 7,970,641 B2 | 6/2011 | Steenstrup et al. | |
| 8,015,070 B2 | 9/2011 | Sinha et al. | |
| 2002/0116297 A1 * | 8/2002 | Olefson | 705/27 |
| 2003/0033218 A1 | 2/2003 | Flaxer et al. | |
| 2003/0093414 A1 | 5/2003 | Litzow et al. | |
| 2003/0204408 A1 | 10/2003 | Guler et al. | |

(Continued)

FOREIGN PATENT DOCUMENTS

JP    2001126012    5/2001

OTHER PUBLICATIONS

Rowan, David: "The next big thing social shopping," Times of London, Nov. 18, 2006, Dialog file 710 #19822632, 2pgs.*

(Continued)

*Primary Examiner* — Rob Pond
(74) *Attorney, Agent, or Firm* — Taylor English Duma LLP

(57) ABSTRACT

A method and associated system is provided for providing an interactive checklist and collaborative shopping session. The method includes displaying desired items on an interactive checklist. A primary user may designate which users can view specific items and should purchase specific items. The method also includes the option for the primary user to send an email to a secondary user with information, extracted from a checklist or registry, with a wish list of items that the recipient can buy with a click to a shopping cart. The primary user may also initiate a real-time or static collaborative shopping session where multiple users can suggest, comment on and purchase items. The primary user may "return" a gift item before the item is shipped and receive credit or cash.

10 Claims, 10 Drawing Sheets

(56) References Cited

U.S. PATENT DOCUMENTS

| | | |
|---|---|---|
| 2004/0078213 A1 | 4/2004 | Brice et al. |
| 2004/0205003 A1 | 10/2004 | Carpenter et al. |
| 2004/0267674 A1 | 12/2004 | Feng et al. |
| 2005/0091120 A1* | 4/2005 | Auletta .......................... 705/26 |
| 2005/0177446 A1* | 8/2005 | Hoblit ............................. 705/26 |
| 2006/0271381 A1* | 11/2006 | Pui .................................... 705/1 |
| 2007/0094087 A1* | 4/2007 | Mitchell et al. ................. 705/22 |
| 2007/0100692 A1 | 5/2007 | Minifie et al. |
| 2007/0282658 A1* | 12/2007 | Brintle .............................. 705/9 |
| 2008/0097927 A1 | 4/2008 | Renzi |
| 2008/0120174 A1 | 5/2008 | Li |
| 2009/0049076 A1 | 2/2009 | Litzow et al. |
| 2009/0177695 A1 | 7/2009 | Mahajan et al. |
| 2010/0088148 A1 | 4/2010 | Presswala et al. |
| 2011/0066522 A1 | 3/2011 | Kleinrock et al. |
| 2011/0071890 A1 | 3/2011 | Hart et al. |
| 2011/0082734 A1 | 4/2011 | Zhang et al. |
| 2011/0082762 A1 | 4/2011 | Ausubel et al. |
| 2011/0099060 A1 | 4/2011 | Litzow et al. |
| 2011/0153452 A1 | 6/2011 | Flinn et al. |
| 2011/0184831 A1 | 7/2011 | Dalgleish |

OTHER PUBLICATIONS

Zakas, Dennis L.; U.S. Patent Application Entitled: Systems and Methods for Bundling Goods and Services, under U.S. Appl. No. 13/411,561, filed Mar. 3, 2012; 65 pgs.

Zakas, Dennis; U.S. Provisional Patent Application Entitled: Bundling Goods and Services, under U.S. Appl. No. 61/449,605, filed Mar. 4, 2011, 47 pgs.

Schoenherr; Journal of Operations Management Article entitled: The use of bundling in B2B online reverse auctions; May 2007; pp. 81-95.

Varian; Article entitled: Pricing Information Goods; Jun. 1995; 8 pages.

Wu; Managment Science Article entitled: Customized Bundle Pricing for Information Goods: A Nonlinear Mixed-Integer Programming Approach; Mar. 2008; pp. 608-622.

* cited by examiner

SYSTEM AND METHOD FOR INTERACTIVE SHOPPING

BACKGROUND

1. Field of the Invention

The present invention relates to a system and method of interactive shopping, and for facilitating a collaborative online shopping experience.

2. Description of the Related Art

During the past decade, many advancements have been made in online shopping capabilities and in the interactive online purchasing of goods and services. Thirty years ago, it was unthinkable for one to complete Christmas shopping for the entire family a week before Christmas from the convenience of one's home computer. However, thanks to the Internet and various technical and product distribution advancements, it is now possible to shop for nearly any type of goods or service from the comfort of one's home, using the Internet and associated online purchasing tools.

Take for instance the improvements associated with the "One-Click" patent owned by Amazon, Inc. See, U.S. Pat. No. 5,960,400. This advancement in the online shopping process allows an online shopper to purchase any number of products via the Internet with a single click of the mouse, such that the payment information needed to complete the purchase and previously entered by the user is automatically pulled and utilized. Therefore, instead of manually inputting the billing and shipping information each time for a different purchase, the online shopper can use one-click purchasing method to use the predefined billing and purchase information and to expedite the online shopping and product purchasing process.

As technological and distribution system and method advancements continue to move the online shopping technology forward, it is important for online shopping solutions to address and attempt to solve problems realized by the traditional shopping methods in the interactive shopping arena. For instance, as one walks though the aisles in a shopping mall, it is often difficult to find detailed product information and summarized consumer reports regarding the products. Thus, prior technical advancements of associating product information with online images and shopping descriptions suggests that improvements can be made to the online experience over and above the shopping capabilities of traditional shopping methods.

Although the interactive online shopper may never be able to hold, inspect, and touch the tangible item for sale, the end goal in developing any interactive online shopping system should be to approximate the traditional shopping method, while making as many improvements to the process as possible, particularly in the areas that lend themselves to computational solutions and technical improvements.

Despite current advancements such as the "One-Click" patent in the recent technology space of online shopping, there continues to be many systematic problems with the current systems and methods. Thus, there remains significant room for improvements regarding the efficiency and facilitation of online shopping.

A particular area of concern is in online shopping collaboration. When two or more persons attempt to shop together, technological solutions are challenged to integrate an efficient and enjoyable online experience for the shoppers into current online shopping systems.

During a collaborative online shopping process, depending on the number of persons taking place in the collaboration, it is not always feasible for each person participating to be online at the same time. Thus, a latency issue may arise with respect to persons making purchasing decisions.

In addition, various computer users have various degrees of comfortability with computers and technology, including online shopping user interfaces. Current solutions to the collaborative shopping process have struggled to take into account the various levels of technical savvy of the end users.

Another area of concern is the problems arising from project shopping or purposeful shopping. Most Internet shopping experiences attempt to approximate browsing through an electronic catalogue. In this situation, shoppers identify items to put into a shopping cart or on a wish list. However, this is not particularly useful for facilitating a project or accomplishing an intended goal. In fact, the area thus far has developed ad hoc manual methods to deal with involved and often complicated shopping situations for events in one's life.

The present invention addresses the aforementioned shortcomings in the current art. The present invention provides an effective breakdown of the traditional process to take advantage of system technologies. In addition, the present inventors have developed a system and method whereby a more efficient, enjoyable, and user-friendly online shopping collaboration may take place.

SUMMARY OF EXEMPLARY ASPECTS OF THE ADVANCEMENTS

Accordingly, a system and associated method are provided that allows for techniques to interactively solve the problems mentioned above.

In one exemplary aspect, a method and system of providing an interactive checklist includes soliciting information from a primary user, creating an account for the primary user, creating secondary accounts for secondary users, generating a customized checklist for the primary user, providing an interface to assist the primary user in customizing the interactive checklist, allowing the primary user to give various levels of read and write access to the other users regarding the interactive checklist, displaying images and information on the interactive checklist regarding merchandise that the primary user is considering, is purchasing or has purchased, updating the interactive checklist when items have been added, removed, or updated, and allowing the primary user to designate which of the secondary users should purchase the listed items.

In another exemplary aspect, the interactive checklist includes items the user desires to purchase, and the user may add items to the interactive checklist, remove items from the interactive checklist, comment on items in the interactive checklist, or purchase items on the interactive checklist.

In yet another exemplary aspect, the interactive checklist includes default items that are suggested based on information entered by the primary user.

In yet another exemplary aspect, the default items are based on specifications provided by a third party.

In yet another exemplary aspect, the interactive checklist, or part of the checklist, is emailed to a user at a specified email address, and contains at least a textual and/or visual description of the items and a selectable option to purchase the items on the portion of the list included in the email, by clicking a "buy" icon that directs the recipient to a shopping cart.

In yet another exemplary aspect, an updated interactive checklist is re-sent to the recipients when an item on the list is changed or updated or a notification that an item on the list has been purchased by a third party is sent to recipients.

In yet another exemplary aspect, a method for allowing a primary participant with an interactive wish list to be notified if a third party purchases a gift for the primary participant that has either been purchased or that is not on the wish list, prior to delivery of the gift, so as to allow the primary participant to effectively "return" the gift prior to the gift being shipped, and thus receive cash or credit for the value of the gift.

In yet another exemplary aspect, a method for providing a collaborative shopping interface includes creating an account for a primary user or organizer of the interactive checklist (or to primary users of related checklists), creating secondary accounts for secondary users, facilitating the primary user(s) in initiating an interactive collaborative shopping session by designating which of the other users to invite to the session, sending an invitation for the collaborative session to the secondary users, providing a commonly viewed page for all the participants to view, providing the interactive checklist on the commonly viewed page, allowing the participant users to search for items to add to a common area, allowing the participants to place items from the search or from a participant's list into a common area, allowing the participants to type or speak comments on the items in the common area, and allowing the participants to determine who should purchase the items.

In yet another exemplary aspect, a method for facilitating interactive shopping is provided that includes providing a main list, notifying a primary user of the purchase of an item by a secondary user, and allowing the primary user to either accept the item or return the item, the accepting the item including forwarding purchase information to a vendor, and the returning the item including granting the primary user cash or credit instead of the item.

In yet another exemplary aspect, the item purchased was either not on the main list or else had been previously purchased for the first user.

It is to be understood that both the foregoing general description and the following detailed description are exemplary, but are not restrictive.

BRIEF DESCRIPTION OF THE DRAWINGS

A more complete appreciation of the advantages of the system and method will be readily obtained as the same becomes better understood by reference to the following detailed description when considered in connection with the accompanying drawings, wherein.

DETAILED DESCRIPTION

Embodiments of the present invention are directed to systems and methods for providing an interactive checklist and viral wish list, and for facilitating a collaborative online shopping experience.

Those skilled in the art will recognize that the interactive and collaborative checklist can be utilized in various platforms and/or technical devices.

Figure 1A:
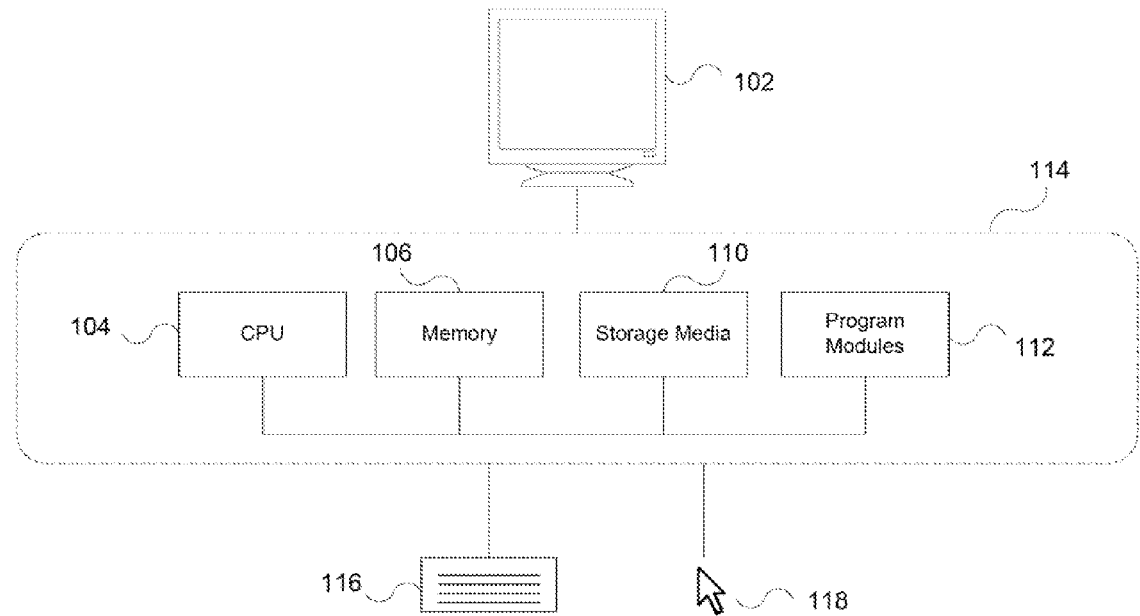
FIG. 1a illustrates a high level block diagram of a computer system on which the exemplary system and method for providing an interactive checklist and viral wish list may be implemented and/or accessed.
Figure 1B:
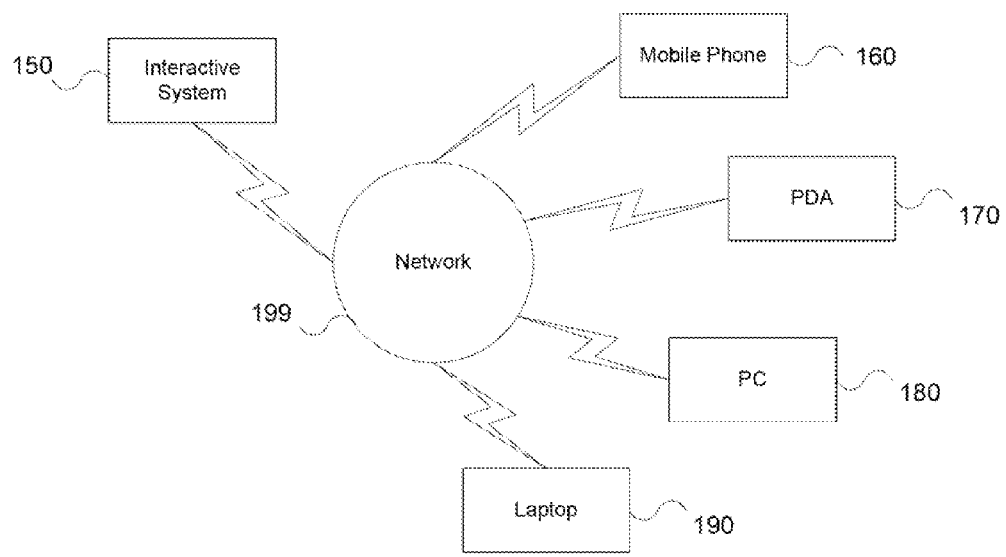
FIG. 1b illustrates a block diagram of the communication network through which the exemplary system and method for providing an interactive checklist and viral wish list may be accessed by one of a plurality of access devices.

FIG. 1a shows a computer system 114 on which the system and method for providing an interactive checklist and viral wish list may be accessed, and FIG. 1b shows a communication network 199 for the same.

The interactive checklist and viral wish list system 150 may include instructions executed on a general purpose computer. The interactive checklist and viral wish list system 150 may be or include a computer system 114. The interactive checklist and viral wish list system 150 may be described in the general context of computer-executable instructions, such as program modules 112, being executed by a general purpose computer. Generally, program modules 112 include routines, programs, objects, components, data structures, etc. that perform particular tasks.

Those skilled in the art will appreciate that the invention may be practiced with various general purpose computer system 114 configurations, including hand-held wireless devices such as mobile phones 160 or PDAs 170, multiprocessor systems, personal computers 180, microprocessor-based or programmable consumer electronics, minicomputers, mainframe computers, laptops 190, and the like.

The invention may also be practiced in distributed computing environments where tasks are performed by remote processing devices that are linked through a communications network 199. In a distributed computing environment, program modules 112 may be located in both local and remote computer storage media 110 including memory storage devices.

The computer system 114 may include a general purpose computing device in the form of a computer including a processing unit 104, a system memory 106, and a system bus that couples various system components including the system memory 106 to the processing unit 104.

Computers typically include a variety of computer readable media that can form part of the system memory 106 and be read by the processing unit 104. By way of example and not limitation, computer readable media may comprise computer storage media 110 and communication media. The system memory 106 may include computer storage media 110 in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit 104.

The data or program modules 112 may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system, or any other operating system or platform.

At a minimum, the memory 106 includes at least one set of instructions that is either permanently or temporarily stored. The processor 104 executes the instructions that are stored in order to process data. The set of instructions may include various instructions that perform a particular task or tasks. Such a set of instructions for performing a particular task may be characterized as a program, software program, software, engine, module, component, mechanism, or tool.

The interactive checklist and viral wish list system 150 may include a plurality of software processing modules stored in a memory 106 as described above and executed on a processor 104 in the manner described herein. The program modules 112 may be in the form of any suitable programming language, which is converted to machine language or object code to allow the processor 104 or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Perl, Prolog, Python, Ruby, REXX, and/or JavaScript for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media 110. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD ROM or other optical media. Other removable/nonremovable, volatile/nonvolatile computer storage media 110 that can be used in the exemplary operating environment include, but are not limited to, magnetic tape cassettes, flash memory cards, digital versatile disks, digital video tape, solid state RAM, solid state ROM, and the like. The storage media 110 are typically connected to the system bus through a removable or non-removable memory interface.

The processing unit 104 that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID integrated circuits, smart chip, or any other device or arrangement of devices that is capable of implementing the steps of the processes of the invention.

It should be appreciated that the processors 104 and/or memories 106 of the computer system 114 need not be physically in the same location. Each of the processors 104 and each of the memories 106 used by the computer system 114 may be in geographically distinct locations and be connected so as to communicate with each other in any suitable manner. Additionally, it is appreciated that each of the processor 104 and/or memory 106 may be composed of different physical pieces of equipment.

A user may enter commands and information into the computer through a user interface that includes input devices such as a keyboard 116 and pointing device 118, commonly referred to as a mouse, trackball or touch pad. Other input devices may include a microphone, joystick, game pad, satellite dish, scanner, voice recognition device, touch screen, toggle switch, pushbutton, or the like. These and other input devices are often connected to the processing unit 104 through a user input interface that is coupled to the system bus, but may be connected by other interface and bus structures, such as a parallel port, game port or a universal serial bus (USB).

One or more monitors 102 or display devices may also be connected to the system bus via an interface. In addition to display devices, computers may also include other peripheral output devices, which may be connected through an output peripheral interface. The computers implementing the invention may operate in a networked 199 environment using logical connections to one or more remote computers, the remote computers typically including many or all of the elements described above.

Various networks 199 may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter.

When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications.

Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths. For some aspects of the invention, such as for the transfer of payments, the communications infrastructure may include networked systems such as the Electronic Funds Transfer (EFT) network, trade exchanges, Electronic Data Interchange (EDI), Extensible Markup Language (XML), and other communication channels and languages known in the industry for implementing trading transactions (which may include settlement operations) such that those described herein.

Although many other internal components of the computer are not shown, those of ordinary skill in the art will appreciate that such components and the interconnections are well known. Accordingly, additional details concerning the internal construction of the computer need not be disclosed in connection with the present invention.

According to various aspects or embodiments of the invention, any of the various above-mentioned computer-oriented systems may be used or applied to the collection, processing, formatting, presentation, or other use or dissemination, of data or information in the present invention. Further, aspects and embodiments of the invention may utilize any of the above mentioned computer-oriented technology in performing or accomplishing any of the above or below mentioned processes or methods.

For purposes of an exemplary application of the foregoing system and method, an exemplary embodiment is described below. This description is not intended to be limited to the following setting, but may be realized in conjunction with various types of systems. But for purposes of the following explanation, the system and method are explained with reference to a college student entering into a college dormitory setting.

One with skill in the art will realize that the present system and method may be utilized in any situation where a shopper is presented with an interactive list of necessary items to complete an objective. As non-limiting examples, this could be in outfitting a dorm room, preparing for summer camp, rebuilding a vintage car, renovating a kitchen, or starting up a business.

When an incoming college student is entering the dormitory setting, it is often necessary for the student to purchase various items for the dorm room or apartment. If the dorm room is shared by multiple students, then the multiple students may need to collaborate to determine which student will bring which items. Furthermore, the students' parents, grandparents, and other relatives may wish to participate in helping the students to purchase the items for the dormitory.

In addition, many dorm rooms have certain requirements for what is permitted and what is not permitted at the school dormitory. Also, many items may or may not be functionally permitted in accordance with the layout and design of the dormitory. For instance, a couch that is too large to fit in the doorway of the dorm room is "functionally" not-permitted. Thus, the present system and method is able to incorporate "default" template interactive checklists that are submitted by, for instance, a representative of the school. This "default" interactive checklist may form the basis for the purchases made for the student, and may also define those things which a resident of a particular dorm might be most likely to need and/or be precluded from purchasing for the room.

With the above college dorm scenario as a point of reference, FIGS. 2-10 are described with reference to the above scenario solely for descriptive benefits, and in no way is intended to limit the scope of the present invention.

Figure 2:
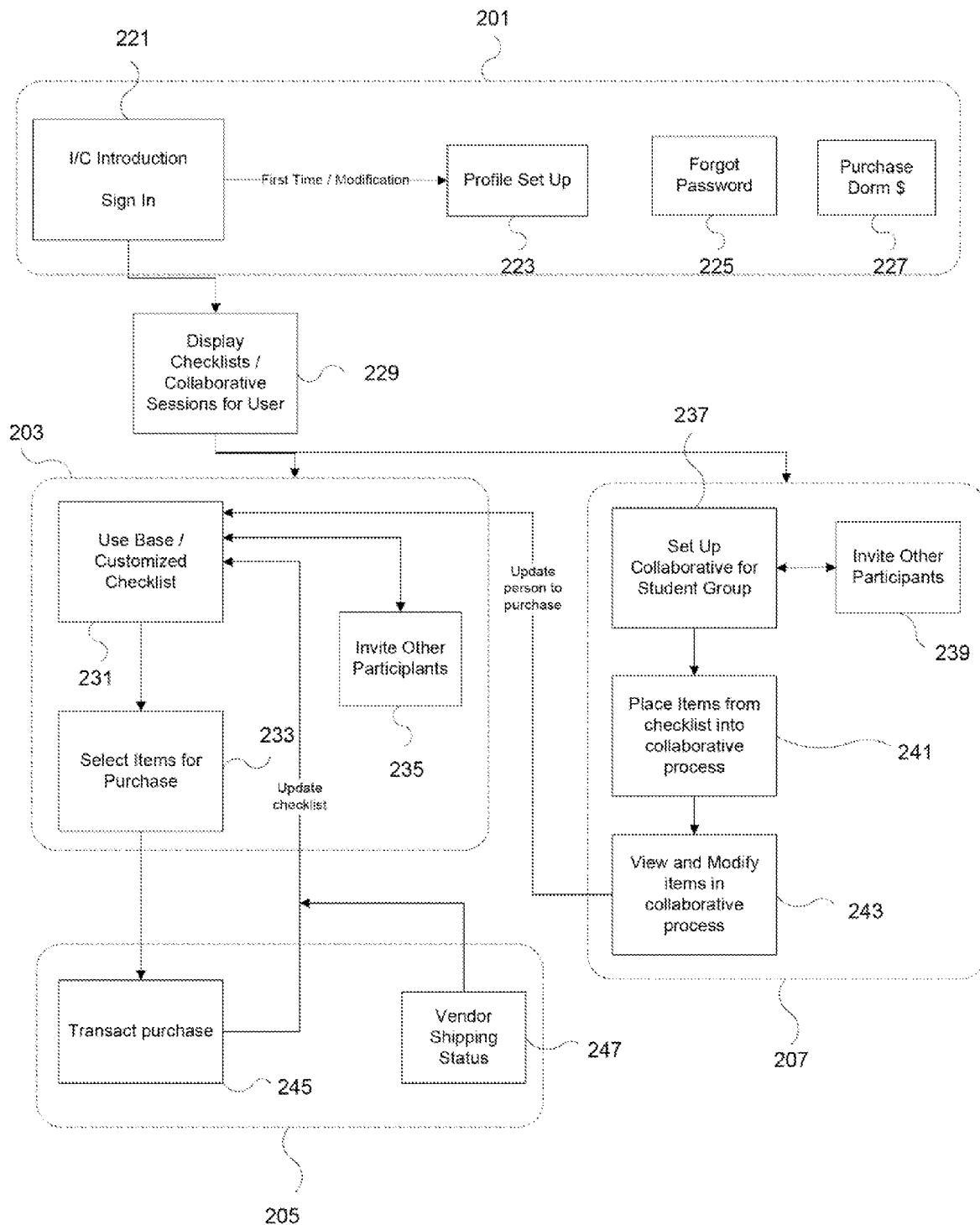
FIG. 2 illustrates a high level work flow diagram of the exemplary system and method for providing an interactive checklist and viral wish list.

FIG. 2 shows a high level workflow diagram of the interactive checklist process 203 and the collaborative flow process 207. These processes are complemented by an administration module 2001 whereby the user is able to login to the interactive system, and a shopping and transaction module 205 whereby the user purchases the offered products.

In this exemplary process, the end user may receive an introduction to the interactive checklist and then sign into the application 221. The introduction may include an explanation of the checklist and collaborative process and may include details regarding use of the application. If this is the first time the end user has utilized the application, the user is directed to a profile set up page, where he or she may enter profile information 223 to be granted access to the site as an end user.

FIG. 2 shows a high level workflow diagram of the interactive checklist process 203 and the collaborative flow process 207. These processes are complemented by an administration module 201 whereby the user is able to login to the interactive system, and a shopping and transaction module 205 whereby the user purchases the offered products.

As will be appreciated by those with skill in the art, these types of applications generally utilize a unique username or email address to uniquely identify the user. These applications usually require a password to authenticate the user. Once the user enters his or her email address or username and password, if there is a system match, the user may be routed to the checklist or to the collaborative home page 229. If there is no match, the user may retry a username or email address and password a specified number of times before the account of the user is locked.

During the profile set-up process, specific information regarding a user may be captured for purposes of creating an account for the user. Fields that may be acquired for the profile information include the person's name, desired user name, information that would allow the interactive checklist to be customized for the person's profile (for example, in outfitting a dorm room, the information could include the college, particular dorm and unique interests of the student, gender, email address, whether the user is a student, parent, or other), whether the user is a returning user or desires to create a new account, one or more security questions and answers, an address, billing information, and credit card information. The term customized can mean, without limitation, the reordering of items or categories, the addition of categories or items, and the changing of the appearance of the checklist (such as font, color, and graphics).

It is also possible for the system to incorporate a collection of mini profile requirements such that the participant may quickly enter the system in order to be a part of an online collaborative session currently taking part. In this manner, additional information may be added at a later time when a purchase is to be made, so that the user may quickly access the system.

While some of the profile fields required for set-up may be mandatory, it is also to be understood that some of the profile fields may be optional. Furthermore, it is also possible that various types of users may have various fields that are requisite for that specific user type. As a non-limiting example, the user participant may be a student or anyone else associated with the student that may be part of the collaborative session or take part in the online checklist. For instance, a participant might be a sibling, grandparent, aunt, uncle, friend, etc.

Once the minimum amount of information is collected, a default customized checklist may be generated 231 based on the entries of the fields required for creation of an account. The checklist will be described in more detail below, but in this manner, the system may create a default "base" checklist to present when beginning the process. Thus, the first time a user logs into the system, he or she may be presented with a basic checklist based on the information submitted by the user. A screen may present all checklists and collaborative sessions associated with the particular user, such that subsequent logins will display the basic checklist, customized checklists (previous basic checklists that have been modified or expanded upon), and collaborative sessions.

The default customized checklist may also be based on other information relevant to the participant. By way of example, and not limitation, in the case of dorm purchases, a report submitted by the dormitory of school of the student, or by an analysis of other checklists created by students in similar situations to the student creating an account. By way of further example and not limitation, a dorm may require twin bed only mattresses, no microwaves, and short ceilings such that certain bookshelves do not fit. In this case, the housing supervisor of the dorm might submit a "default" checklist to the operators of the system, such that all users logging into the system and creating checklists for that particular dorm room are defaulted to use the school-designated list. One with skill in the art will appreciate that the default checklist may be created in any number of ways, and that in the alternative, the primary participant creating the account may override the default items placed on the checklist. For instance, the default customized checklist may be generated based on relevant specifications such as camp requirements, taste in particular types of wines, taste in particular styles of décor, and personal interests.

The checklist itself provides a list of items that the primary user may desire to purchase. The checklist may provide placeholder slots for the user to choose specific items which may then fill the placeholder slots. Each category on the checklist links into the items for sale on the web site and may be linked to items on third-party web sites. The checklist may be used to identify and track all of the efforts to purchase a list of items, even items that have already been purchased or may be purchased in another manner apart from the online process. A participant can view items, maintain items for further consideration and purchase items from the checklist. The primary user may customize the checklist by removing or adding categories of items or optionally changing the order of the items or categories, font and graphics. In addition, multiple items of the same type may be placed on the checklist in order to provide a range of items for a purchaser to select. Budget information may also be entered to measure against possible purchases, or allow the users to track spending amounts. Checklists may provide for the categorization of items that may expand to view the items underneath. For instance, in the above dorm example, the bedding section may expand to view pillow cases, sheets, comforters, and other bedding that the user desires to purchase.

Some of the end users will have the capability of adding to and modifying checklists, while other users may be granted read only access to view and purchase items on a checklist associated with another user. In a non-limiting example relating to dorm purchases, the incoming freshman student (primary user) might create a checklist and have read and write access to add items to the checklist, while he assigns his grandparents as end users of the system read only access to view and purchase items on the list.

The access to the checklist may be designated by the creator of the checklist, such that the primary user may allow others to have read and write access to the checklist. The primary user may also create new blank checklists, or select from a variety of checklist templates in creation of a checklist. For instance, the system may provide an "economy" checklist that is very budget conscious, as well as an "ultimate" checklist that contains the best and top line of every product without concern for price.

In an exemplary embodiment, items from the base checklist may be available to be re-activated at any time. In this manner, removed items may be shown in the checklist as grayed out or in a removed category that is easily viewable. The current status of purchases and pending purchases may be displayed.

As described in more detail below, the primary user may create a collaborative session that may use the checklist as a reference, and items as such may be marked as having a pending collaborative session.

The system and method may also incorporate a process whereby a primary participant creating an account may be able to invite others 235 to participate in the collaborative shopping. This could be implemented, for instance, by allowing the primary user to enter an email address for which to send an invitation. In general, any user of the system might be able to send an invitation to any other email address.

The primary user may assign any individual checklist item to one or more specific participants to purchase, and multiple participants may share in the payment of the purchase price for a single item. Items on the checklist may be designated as private so that they remain viewable only to the primary user and any particular item may be linked to one or more other participants for purchase or into a collaborative session or checklist. In addition, the primary user may make the entire list (or particular items) available on a read-only basis to specified participants.

The primary user may view all the products, including details, images, and pricing from the system vendors that will provide merchandise to fill the checklist items. By way of example (in the case of dorm purchases) and not limitation, a click on the pillowcases may direct the shopper to all of the pillowcases on the system site available for viewing and purchase. The system may also provide suggested items based on the primary user's profile or limit the number of items shown to limit bombarding the user with too many of one product. The primary user may also view products, including details, images, and pricing from third-party vendors, through links, that provide merchandise to fill the checklist items. Finally, participants may upload information concerning products, including details, images, and pricing, that they are providing or that are available from third parties to fill the checklist items The primary user may assign a participant to each item to purchase, or else leave the item as a general item on the list for some or all of the participants to view (in the case of non-private items). The primary user may determine which items the participants may view in the checklist. Of course, this could include the option of allowing a participant to view all items on the checklist, regardless of assignment.

Once the user has initially entered his or her login information and is verified in the system, the checklist and/or the collaborative sessions associated with the user are displayed 229. As shown in FIG. 2, the user is able to purchase DORM DOLLARS™ 227. In essence, this DORM DOLLARS™ feature allows a user to transfer money to another user's account in order to purchase items on the interactive checklist rather than specifying an item to purchase. Adding DORM DOLLARS™ to a stored value account within the system for use by the purchaser or another user gives the system flexibility to allow "gifting" dollars or items by allowing the purchaser to enter the recipient's email address, or other unique identifier in the system. Of course, the purchaser might also desire to purchase an item for the recipient in the traditional manner rather than sending DORM DOLLARS™ 233.

As one with skill in the art will appreciate, the user may have the option to either select to use the credit card on file, or else to add a different credit card to his or her profile. In this manner, the purchaser is able to complete the transaction, which the current system will then process through an eCommerce merchant facility. The purchaser may complete a transaction as to some or all of the items on the checklist at any one time. Merchandise selected for purchase is assigned to a shopping cart on the eCommerce site, where they can be purchased all at one time.

Upon completion of the credit card transaction, the purchaser may be notified on screen with a confirmation number, and email may be sent to the purchaser for confirmation, a notification could be sent to the recipient along with a message from the purchaser, or any combination of the above may be employed. In addition, an activation email may be sent to the recipient to add the DORM DOLLARS™ to the account. Finally, the recipient may have the ability to review the account DORM DOLLARS™ balance.

During the shopping process, the user is able to transact a purchase as to some or all of the merchandise identified to satisfy checklist items. An order identifier, item information, and purchaser and recipient profile information may be passed to the eCommerce engine to complete the purchase. At this time, the eCommerce platform quantities may be decremented, credit cards validated, and item details updated after processing of the transaction.

The present system and method additionally support order status 247 and line status from the vendor via the eCommerce vendor portal or EDI type transactions that may update the eCommerce database. Updates to the eCommerce order database may trigger updates to the system checklists. The system updated information may be keyed to the order identifier generated by the system when the checklist becomes an order. This information may include a product identifier, item number, vendor SKU, quantity shipped, shipping method, and tracking number. Updated status information may be available to the user and participant who ordered the item.

Once the user has designated the desire to create a collaborative session, he may enter set-up information for the collaborative group 237. A collaborative session will involve at least two participants, and some sessions will involve more (e.g., in the dorm example, multiple family members and suitemates). It is also possible that there are multiple collaborative sessions per checklist. For instance, in the dorm example, the student might wish to first engage in collaborative shopping with parents, and later in time engage in collaborative shopping with suitemates. A collaborative session may be in real time (interactive) or static in nature.

Static sessions may employ a store and forward structure where the items are placed in a collaborative session (either from a participant's checklist or from a search directly into the session) and the participants are notified. Each participant may come to the session when they are able to make comments on items or purchase items. The interactive collaborative session will provide a real time view of products and comments from all participants regarding the specified items.

Once the user has set up the collaborative session 237, the collaborative session in general may have a limited active life. For example, either the items placed on the list should be selected for the checklist for further consideration or purchased, or else they will expire in a specified number of days. The primary user is the one with the user authority to set up a collaborative session or add participants to the collaborative session 239.

A participant may initiate a collaborative session with the primary user if the participant wants to review other items due to cost or type of item subject to the primary user's acceptance. Items may be placed from the checklist or from a search of the eCommerce merchandise or third party web sites into the collaborative session for discussion and comments by the participants 241. At the end of the collaborative session, an item may be moved to the checklist for purchase by a participant and may be reflected on the primary user's checklist to indicate that an item has been satisfied. Items may be re-assigned during the collaborative session 243. For instance an item that comes into the collaborative process from participant A may ultimately end up on participant B's checklist.

Figure 3:
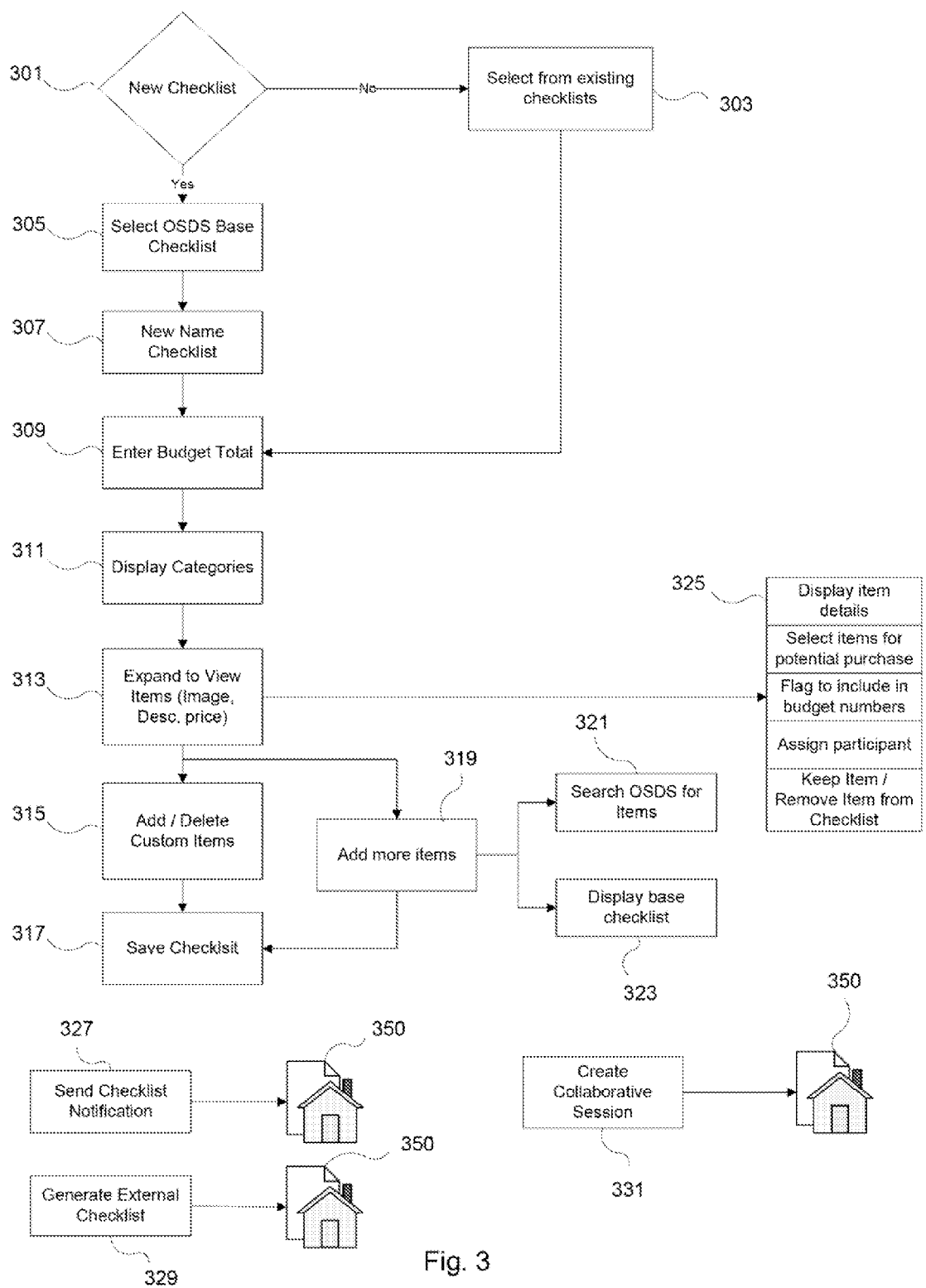
FIG. 3 illustrates a high level work flow diagram of the exemplary system and method regarding checklist management by a primary user.

FIG. 3 shows various aspects of the exemplary workflow process regarding checklist management by a primary user, for instance a student in the dorm example. In general, the checklist is at the core of the present system and method. All purchase and collaborative activity may be managed from the checklist home page 350. There are two primary parts to the checklist process. The first part of the process is the checklist management process. This process is controlled by the primary user to identify which items the primary user will need using the provided checklists. The primary user will also budget for the items, identify participants for the checklist, initiate the collaborative process 331, and notify participants of the specified items. The second part of the process is the purchase process for the primary user or a participant to place selected merchandise that satisfies items on the checklist into a shopping cart for actual purchase.

Three additional functions are available to expand the checklist function. These include sending a checklist notification to the participant 327, creating a collaborative session 331, and generating an external checklist 329.

If the checklist desired to be viewed is not a new checklist 301, then the user is prompted to select from existing checklists 303. In the case of multiple checklists, the user may assign names to each of the checklists to distinguish them from each other. If the user desires to create a new checklist, then the system may either returns the default checklist 323, or else the user may select a particular type of checklist 305. For instance, the system could have defined a general default dorm checklist from which the user bases his own customized checklist. The user is then prompted to enter a new name for the checklist 307. In this way, multiple checklists may be associated with a particular user. A user may also specify a budget total for a checklist (or particular items or subcategories) 309, and the system will keep a running total comparing purchases or items under consideration with the budget and notify the user when the budget threshold is surpassed.

One or more budget totals may be entered in the checklist. There can be an overall budget, the primary user's budget, another participant's budget, an item or category budget, etc. As a product is selected for consideration or purchase, the price of the item may be tracked against the selected budget. The primary user may be able to scan various products for a checklist item to see the affect on the overall budget. In addition, at the item level, the primary user may be able to mark an item as a budget item or not.

The checklist may be capable of displaying the items by categories (e.g., in the dorm room example, bedding, food, apparel, other) 311. The categories may be expandable to see the items in each category, or group the items by category. The line item display may show the product image, a short description of the product, and a price for the product 313. For each line item displayed, the primary user may also display the expanded item description, flag the item to include in the budget, view the item image, assign the item to a participant, flag the item as already owned, assign a link to a third party web site that sells the product satisfying the item or otherwise remove the item from the list, keep/remove the item in the checklist 325.

The user will also be able to delete items or add items 315 not on the checklist that the user would like to make sure not to forget or that are available in the system or from third party email sites 319. In order to facilitate the addition of items, a searching capability 321 may be made available to facilitate the selection of items with the option to include them on the checklist. Products selected from the catalog or third parties will be added into the applicable section of the checklist. If there is no match, the product may go into a miscellaneous category. At the end of the process, the participant may save the updated checklist for later use 317.

Figure 4:
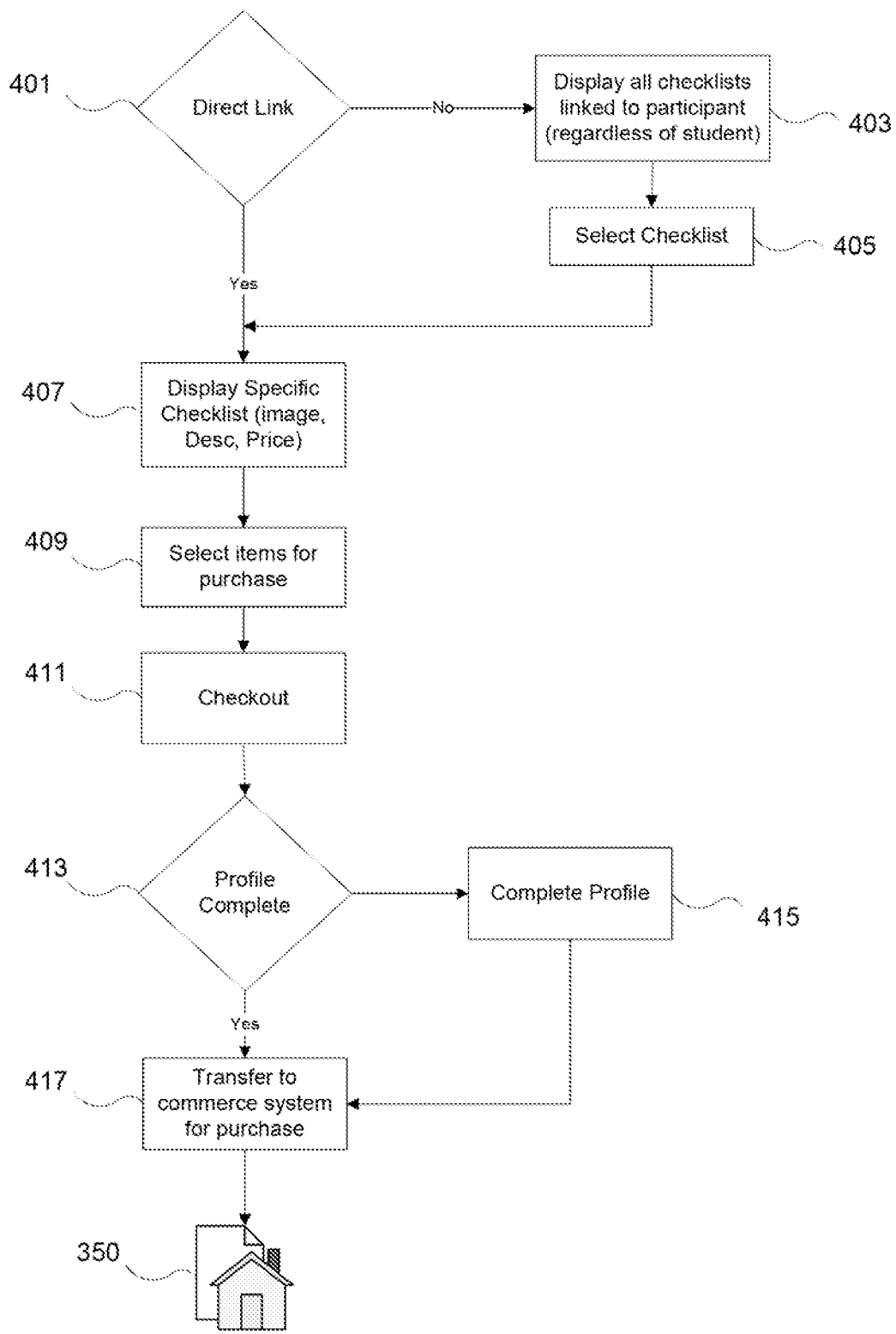
FIG. 4 illustrates a high level work flow diagram of the exemplary system and method regarding product purchase by a user.

FIG. 4 shows various aspects of the exemplary workflow process regarding product purchase by a user. The purchasing process may only be directly linked 401 or accessed from a checklist. However, there may be two different ways for participants to view a checklist. First, the participant may log in to the system to see all of the checklists associated with the primary participant to the extent not marked private or otherwise blocked from the particular participant's view 403. In this case, the primary participant could send the recipient a link to the checklist for consideration with varying requirements to log in.

The second way for a participant (or even a non-participant, e.g. one who has not created a profile) to view a checklist may be from a branded email sent by the primary participant. In this case the primary participant identifies particular items on a list (by clicking on those items or directing the system to select items associated with the particular recipient), types in or selects the email of the recipient, optionally may add a message and instructs the system to generate an email to that recipient. An email is sent to the recipient that lists the selected items (including for each product to be considered, a product description, picture and price). This information may be displayed in the email (that is, not in an attachment) This process is described as the viral wish list. It is noted that this process will allow those who are not granted access to the checklist itself on the provider's site and do not participate in the static or collaborative shopping session to purchase items. This could be used, for instance, for a bride to send portions of her registry to bridesmaids (without their having to go to her registry), and further would allow the bridesmaid recipients to forward the whish list to others attending the wedding. The emailed wish list may include a "buy" icon that would allow the recipient of the email (including forwarded emails) to select an item for purchase and go directly to a shopping cart, without ever having to view the checklist or registry or otherwise go to the provider's site.

In both instances, the checklist will contain a line item summary to be viewed by the user. This summary may include at least an image of the product, a brief description of the product, and the price of the product 407. The system may also offer an expandable information section which contains more than the minimal information.

The second way for a participant (or even a non-participant, e.g. one who has not created a profile) to view a checklist may be from a branded email sent by the primary participant. In this case the primary participant identifies particular items on a list (by clicking on those items or directing the system to select items associated with the particular recipient), types in or selects the email of the recipient, optionally may add a message and instructs the system to generate an email to that recipient. An email is sent to the recipient that lists the selected items (including for each product to be considered, a product description, picture and price). This information may be displayed in the email (that is, not in an attachment). This process is described as the viral wish list. It is noted that this process will allow those who are not granted access to the checklist itself on the provider's site and do not participate in the static or collaborative shopping session to purchase items. This could be used, for instance, for a bride to send portions of her registry to bridesmaids (without their having to go to her registry), and further would allow the bridesmaid recipients to forward the wish list to others attending the wedding. The emailed wish list may include a "buy" icon that would allow the recipient of the email (including forwarded emails) to select an item for purchase and go directly to a shopping cart, without ever having to view the checklist or registry or otherwise go to the provider's site.

Figure 5:
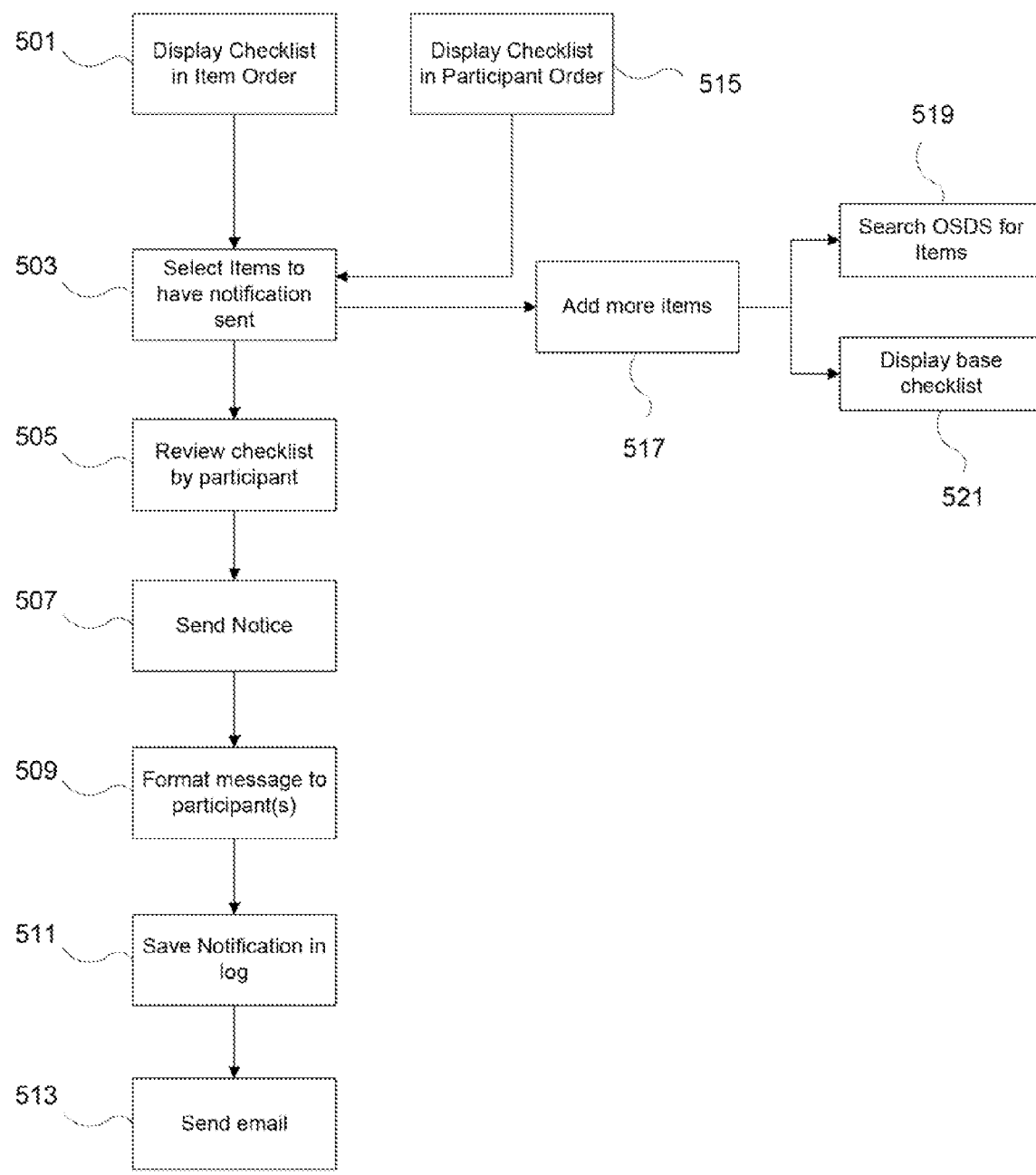
FIG. 5 illustrates a high level work flow diagram of the exemplary system and method regarding the checklist notification and response process.

FIG. 5 shows various aspects of the exemplary workflow process regarding checklist notification and response. In this process, after the primary user has identified desired participants for collaboration on a specific checklist, the user may take a variety of actions. The first action a user may take is to notify the desired participants that the user has determined which items need to be purchased and then to direct the participants to the site.

Users may invite other participants to join their network. Each invited participant may accept the invitation in order to participate. In a non-limiting example, the system may allow the primary user to enter email addresses of those persons designated to invite, and then send emails with links to the invitees for acceptance. The system must allow for invitees to participate with multiple users. The system might also distinguish between those invitees already with a system account, and those invitees who might need to create a new account.

The second action the primary participant may take after identifying desired participants for collaboration is to generate a wish list, that includes some or all of the entire checklist, with the particular items that the particular participant is to consider. For example, a parent could send more expensive items on a child's birthday wish list to wealthy friends and relatives, and less expensive items to others. The wish list, a representation of some or all of the items on the checklist, includes the thumbnail, description, price and a link to the eCommerce checkout will be created and sent to various participants 503. The third action a user may take is to initiate a collaborative session.

In general, there are two optional views by which the user may begin the checklist notification process. The first optional view is to display the checklist by classification, or in item order 501. The second optional view is to display the checklist in participant order 515.

To create a checklist notification, the user may simply select the participant(s) that have been attached to each item. Also, multiple participants may be selected for a particular item. In one embodiment, when a purchase has been made of an item with multiple participants, the remaining participants may be notified that the item has been purchased or an updated checklist can be distributed to previous recipients showing that the item is no longer desired by the primary participant for purchase. Alternatively, the system may provide and the primary participant may elect, that the checklist not reflect the purchase and that no notification be sent. In this case anyone purchasing an already purchased item (or purchasing merchandise that is not on the checklist or identified for consideration by the primary purchaser) will be allowed to consummate the purchase on the eCommerce platform. After the credit card is processed, the primary recipient is notified that the purchase has been completed and is given the option, within a period of time selected by the provider, to either accept the purchase (in which case the order is forwarded to the vendor and fulfillment is completed in the usual way) or to "return" the item, in which case the primary recipient receives cash, credit or (in the dorm example) DORM DOLLARS™ (less a handling fee). Note that the system may provide that the purchaser of the item is not notified when the item is "returned" by the primary user. This effectively allows the primary user to avoid hurting feelings and more dynamically and efficiently utilize the purchases of others. This system for facilitating returns prior to shipment can be used in connection with any gift purchases on the Internet, whether or not there is a checklist, registry or shopping list.

The item search 519 is also available for the participant to purchase merchandise not on the checklist and to add that merchandise 517 to the checklist during this process. If additional merchandise is purchased, the merchandise may be added to the checklist so that the primary participant can track for thank you notes. In addition, the primary participant may decide to display the base checklist to view the checklist before the additions were made 521. An email may be sent 513 that directs the recipient to the checklist on the website and thus allows the recipient to see the entire checklist stored in the system and propose additional items for the checklist, if desired or to go directly to the checkout using the eCommerce platform to finish the transaction.

After all selections are made 503, the system may display each checklist by participant for review 505 to ensure that the proper items are being sent to the correct participant. The send notification 507 option may format the message 509 to each participant with a unique identifier that will be used to guide the system when the participant returns to purchase the item. A log of the participant/item will be kept 511 in case the primary user needs to review what was sent at a later date. The system may send the email notification using the enterprise email system.

Figure 6:
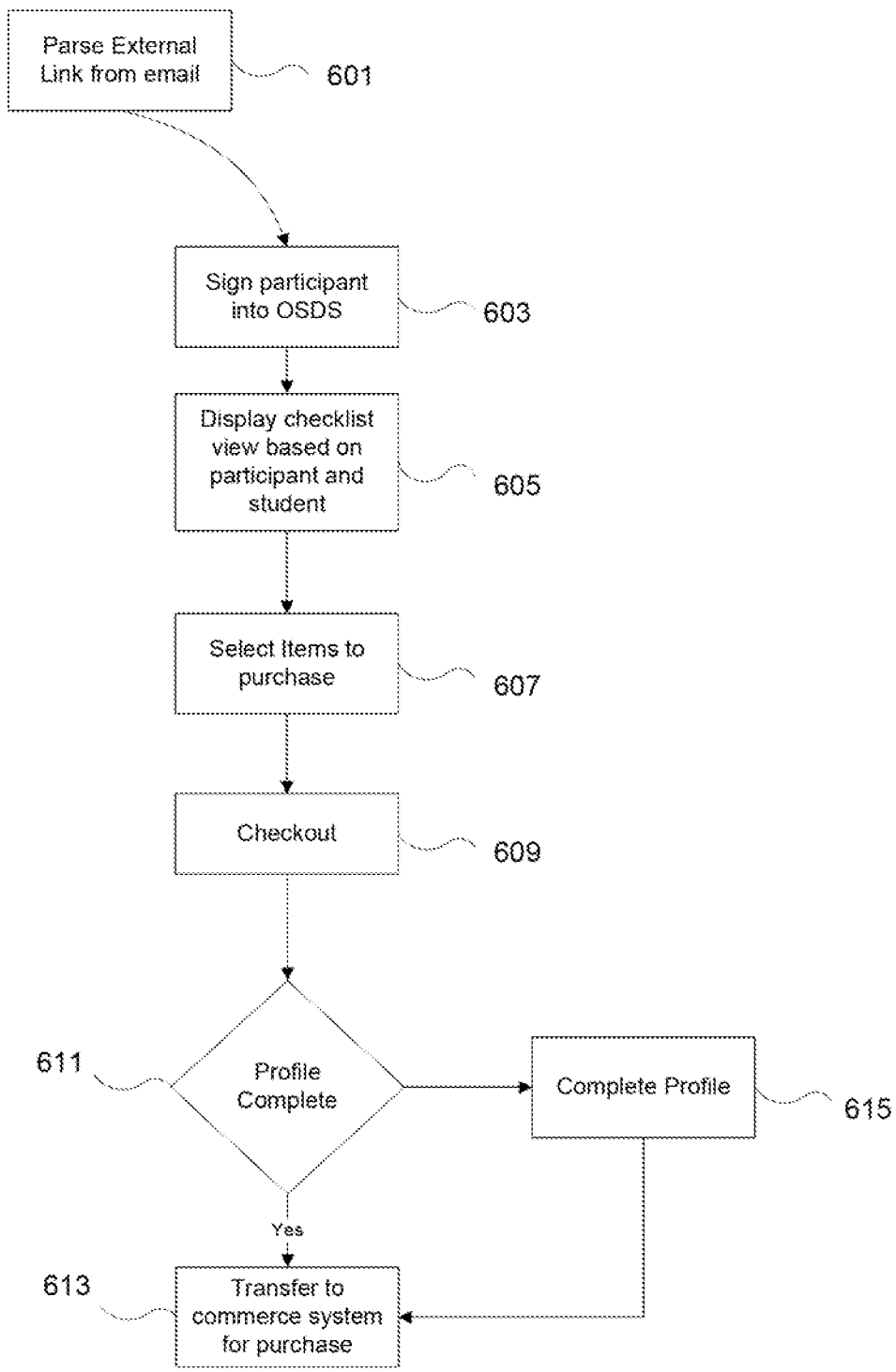
FIG. 6 illustrates a high level work flow diagram of the exemplary system and method regarding checklist response after a checklist is sent to a participant.

FIG. 6 shows various aspects of the exemplary workflow process regarding checklist response after a wish list is sent to a participant. After a wish list is sent to a participant, the participant may either "buy" directly from the eCommerce platform or go to the system to complete the transaction to purchase the item(s) for the primary user. In the latter case, for example, the participant may want to compare items from the emailed wish list with other items on the checklist or even other items from the provider's catalogue. Accordingly, the system should attempt to make the process as simple and quick as possible, in order to locate the checklist and purchase the items. The response to the email link may be parsed 601 using the participant's unique identifier to locate the user/order combination.

In one exemplary embodiment, when the checklist or participant is identified, the participant may be logged into the system 603 and the checklist may be displayed 605. The participant may select the items for purchase 607 and proceed to the checkout 609. If the participant's system profile is insufficient to complete a checkout 611, for instance with credit card, billing and address information, then the participant may be required to complete the profile 615 before checkout. After this, the system may transfer the participant to the eCommerce platform to process the shopping cart 613.

In an alternative embodiment, the participant may be able to purchase the merchandise without logging into the system. In this case, the buying participant may go directly to the shopping card and enter billing information there, thus bypassing the system entirely.

Figure 7:
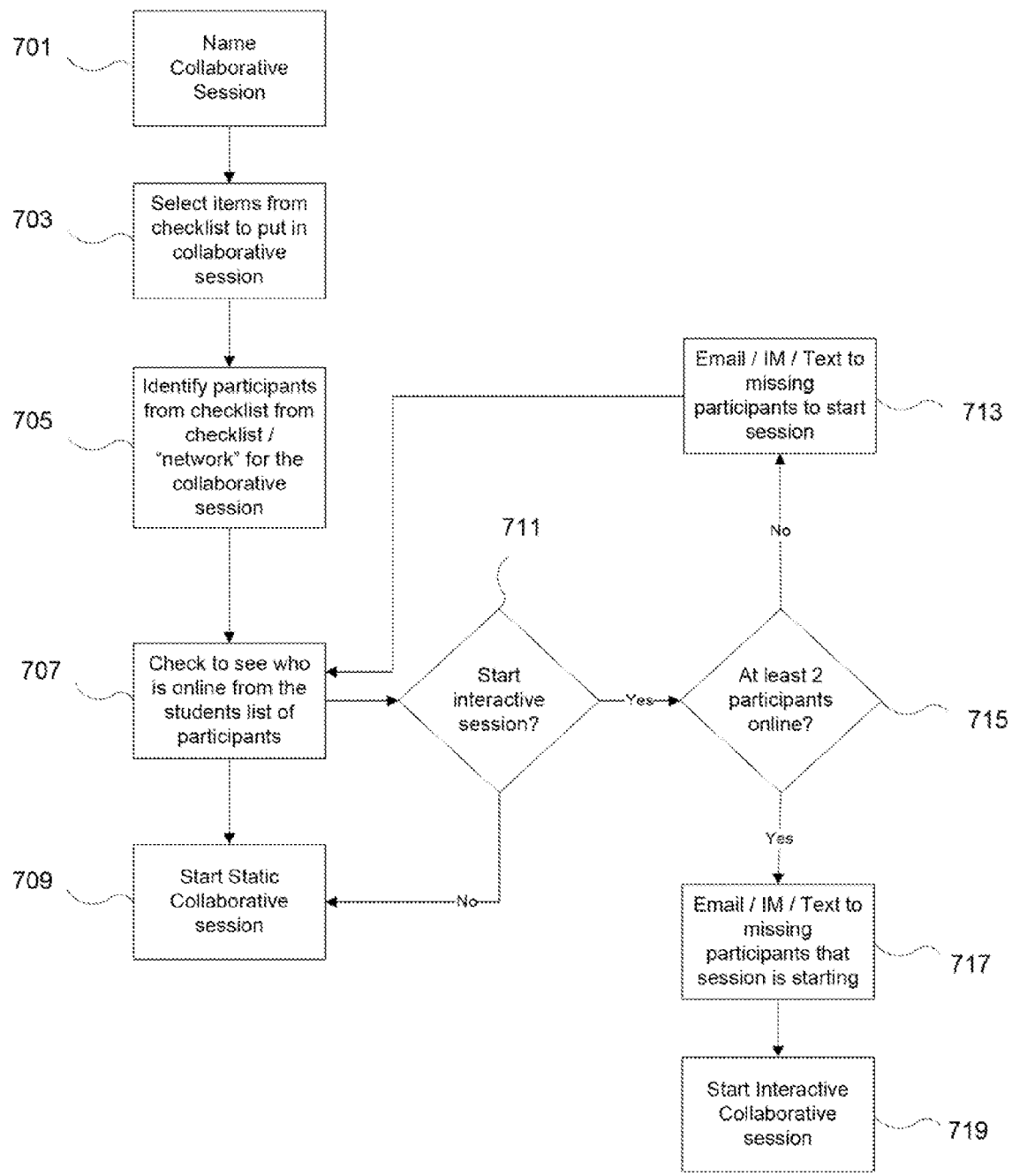
FIG. 7 illustrates a high level work flow diagram of the exemplary system and method regarding a collaborative session.

FIG. 7 shows various aspects of the exemplary workflow process regarding a collaborative session. A collaborative session may be executed either as a static session, where participants are not interacting at the same time in real time, or as an interactive session, where participants may see and comment in real time about the items under consideration. The background set-up process for either a static or an interactive session is relatively the same. The collaborative session may begin from the checklist. Initially, the collaborative session may be named 701 so that it can be differentiated from the multiple sessions that will occur with different participants. The primary user may then select the items from the checklist that will be part of the collaborative session 703, as long as the items are known at that time.

Next, the user may then identify participants to include in the session 705. Although a participant is already assigned by the primary user to purchase an item on the checklist, it is not necessary that the participant will automatically be included in the collaborative session. Of the participants selected, the system may display the participants that are online at the current time 707 so they may quickly join the session. Next, the system may determine if the collaborative shopping will be an interactive or static session, for instance, by a designation from the primary user 711.

If the session is determined to be static, the system may begin the static collaborative session 709. For an interactive session, at least two people should be online before the system begins the session. Also, the system may allow the originator to send a message (IM, text, or email) to the missing participants to prompt them to sign online 713. When at least two participants are present in the collaborative session 715, the system may optionally notify the other participants that the session is starting 717. Once the missing participants have been notified that the interactive collaborative session has begun 719, the users may end the session at any time.

Figure 8:
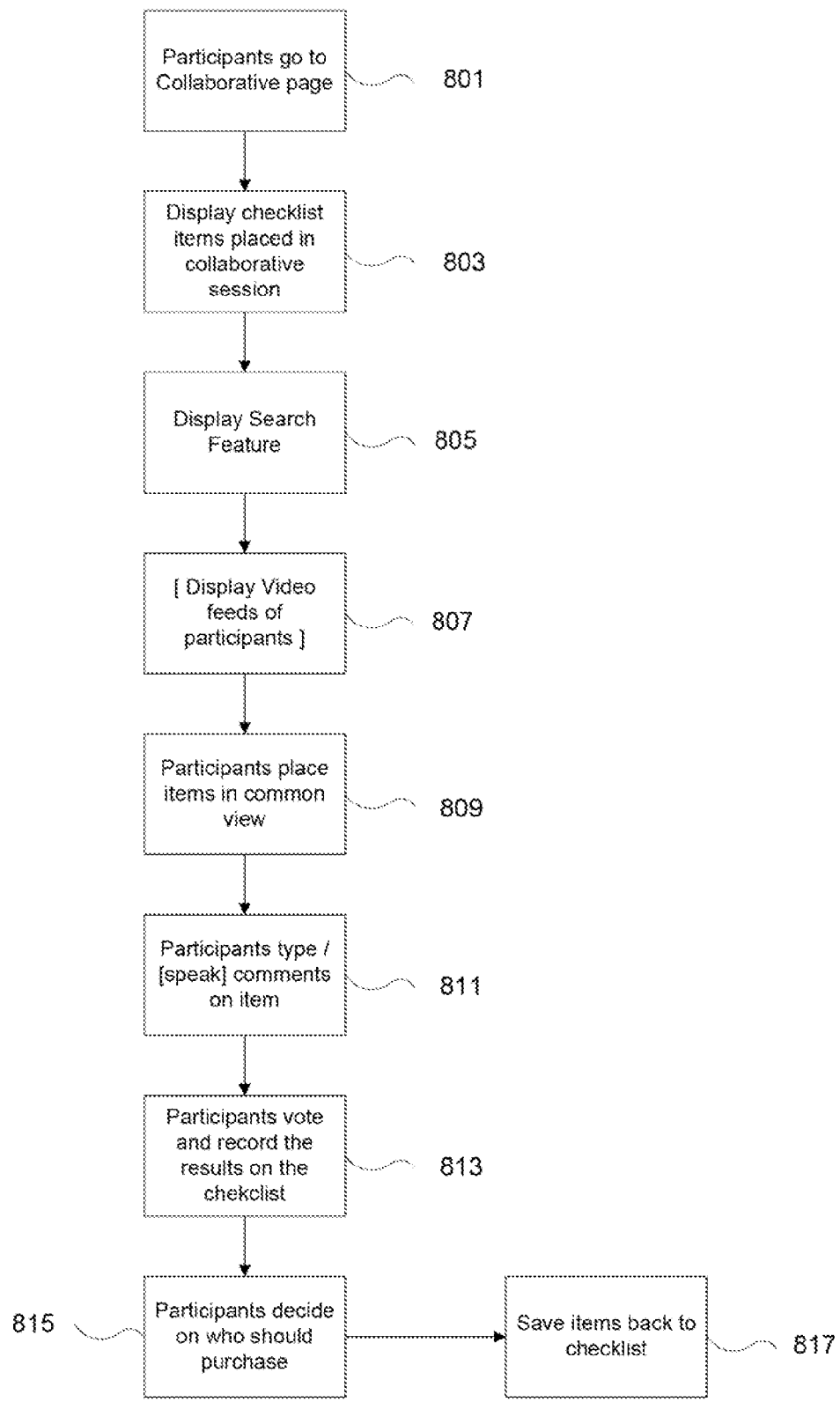
FIG. 8 illustrates a high level work flow diagram of the exemplary system and method regarding an interactive collaborative session.

FIG. 8 shows various aspects of the exemplary workflow process regarding an interactive collaborative session. The interactive collaborative feature is a feature distinctive to the present system and method. Multiple participants are facilitated in viewing, commenting on, voting for, and selecting items for purchase. The process concludes with placing the item back into a check list with the purchaser designated.

The intent of the interactive collaborative session is to discuss items to purchase, and determine who will be ultimately responsible for purchasing each item. After the interactive collaborative session, the purchaser may then complete the transaction. The participants may split the cost, for instance on a percentage basis, in order to cover the cost of the item.

When the interactive session is initiated, the participants may be taken to a commonly viewed page 801. Some or all of the checklist associated with the session may be displayed at the commonly viewed page 803. A unique item search may be displayed 805 for each participant, so that each participant may search the catalogue and/or other web sites independently of the other participants and bring additional items to the session. The system also may display a common comment area so that each participant may read the comments others have made about the items. Also, it is possible that a third party video feed 807 may be displayed for the participants to converse about an item. Participants may place the items into a common view 809, at which time the other participants may comment on the item. Participants may type and/or speak comments 811, so that others in the group may also initiate dialogue about the item. In addition, participants may decide on who should purchase the items by selecting the name in the purchaser field and conducting, for instance, a vote 813. Once the participants have decided who should purchase which items 815, the items are then saved back to the checklist with the updated information 817.

Figure 9:
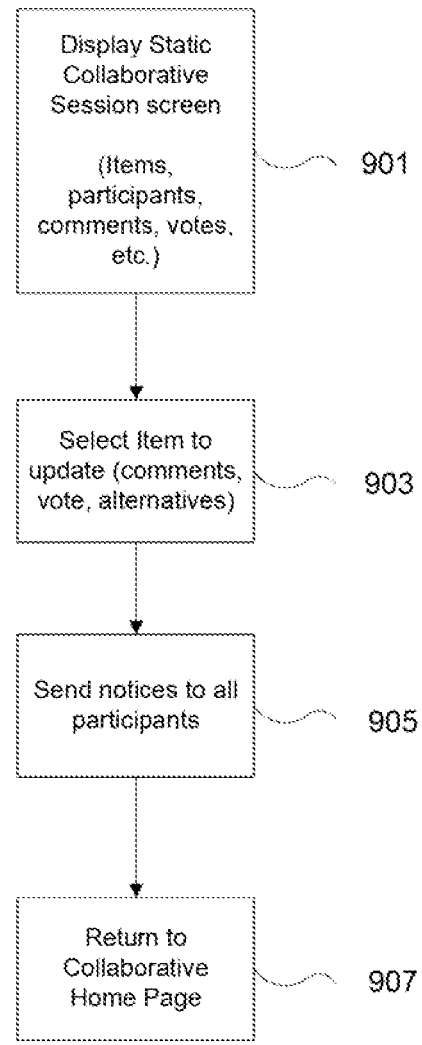
FIG. 9 illustrates a high level work flow diagram of the exemplary system and method regarding a static collaborative session.

FIG. 9 shows various aspects of the exemplary workflow process regarding a static collaborative session. The static collaborative process is used when participants are not in a session at the same time. In this situation, the collaborative participants will work independently to make their selections and comments. The results may be stored centrally in the system for all participants to view at later times.

A participant may initiate a session by creating a new session or selecting an existing session. Once logged into a static session, the participant will may view of the items and the basic information (thumbnail, description, price) and optionally a vote (i.e. thumbs up/down, smiley faces) of the other participants 901.

To view the details of a particular item, the participant may select the item to display more detail 903. The detail may include the expanded description, comments from the other participants, and the votes from the participants. When the participant has completed his or her review and has exited, the comment may be saved to the central system database. In addition, the system may allow the participant to not save the comments and start over. When a session is successfully saved and the participant has exited the static session, a message may be sent to the other participants that the session has been reviewed by the participant 905. The message may include a link enabling the other participants to log the collaborative session. After the participant has finished the static session, the system may return the participant to the home page 907. If two or more static participants are online at the same time, the system may offer an option to convert the static session to an interactive session.

Figure 10:
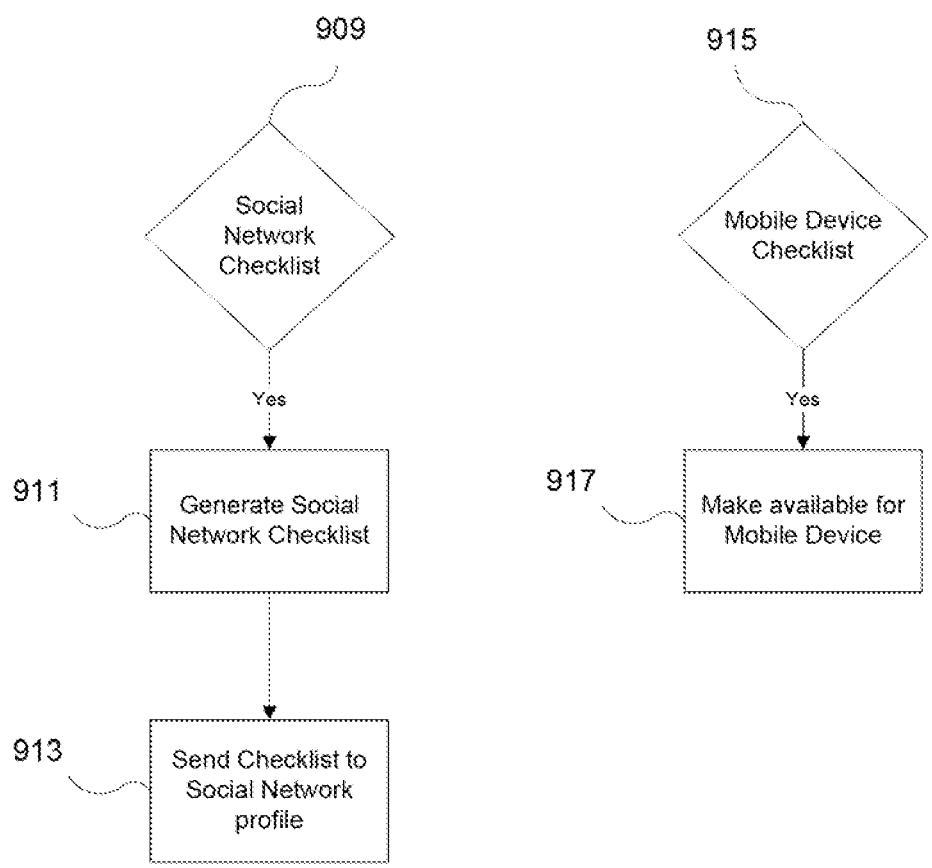
FIG. 10 illustrates a high level work flow diagram of the exemplary system and method regarding generating an external checklist.

FIG. 10 shows various aspects of the exemplary workflow process regarding generating an external checklist. A key marketing tenant of the current method and system is to provide a functional method for the primary user to distribute the form of checklist to as many participants as possible. The checklist can be generated in multiple external formats, including Facebook, MySpace, or any other social networking sites, and for any mobile or wireless device, such as iPhone or Blackberry. For the social network 909, the student will pass selected items or an entire checklist to the social network generation process 911. Selected items may be necessary so that the entire checklist is not published to the social network world. In this manner, the system will facilitate the user in creating the system social network checklist file, and then running the system social network application to load the checklist file to the student's social network page 913.

For the mobile device, the system will facilitate the user in creating the system mobile device application file, loading the mobile device application file to the system mobile device file server, and running the mobile device application 917.

Finally, the foregoing discussion discloses and describes merely exemplary embodiments of the present invention. It is recognized that the above may be utilized in any number of settings, including, but not limited to: construction and remodeling, wedding, bar mitzvah, baptism and other registries, outfitting college dorms, boarding schools and apartments, provisioning for an office (particularly in the SOHO market), starting up a business, Christmas, Hanukkah and birthday gift giving and rebuilding vintage automobiles.

As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology.

The invention claimed is:

1. A computer based method for providing an interactive checklist, the method comprising:
providing interactive checklist functionality to a primary user, wherein the interactive checklist is created or modified by a set of processes managed by a computer for the primary user including:
responsive to input from a primary user, creating the interactive checklist by the computer, wherein the interactive checklist includes placeholder slots integrated into the interactive checklist that accommodate item entries, and wherein entries, removals, and purchases are updated automatically by the computer, and
customizing the interactive checklist for collaboration with at least one secondary user, including receiving input from the primary user to assign at least a subset of items from the interactive checklist to the at least one secondary user; and
communicating electronically information regarding the at least a subset of items from the interactive checklist to the at least one secondary user, wherein the electronically communicated information at least includes a selectable option for the at least one secondary user to purchase any of the at least a subset of items from the interactive checklist.

2. The method according to claim 1, further comprising:
notifying the primary user of the purchase of an item that is either not on the interactive checklist or that had been previously purchased; and
enabling the primary user to either accept the item or to reject the item,
wherein accepting the item includes forwarding purchase information to a vendor to effect delivery of the item, and rejecting the item includes stopping the item from being shipped and granting the primary user cash or credit instead of the item.

3. The method of claim 1, wherein the selectable option directs the recipient directly from the electronically communicated information to a purchase screen.

4. The method of claim 3, wherein the purchase screen includes a shopping cart that displays the items for purchase.

5. The method of claim 1, wherein the primary user is enabled to purchase any checklist item directly through the interactive checklist.

6. A system for providing an interactive checklist, comprising:
a processor configured to execute instructions; and
a memory configured to store instructions, the instructions including:
a primary account module stored in the memory for providing interactive checklist functionality to a primary user, wherein the interactive checklist is created or modified by a set of processes managed by a computer for the primary user including:
responsive to input from a primary user, creating the interactive checklist by the computer based on the information, wherein the interactive checklist includes placeholder slots integrated into the interactive checklist that accommodate item entries, and wherein entries, removals, and purchases are updated automatically by the computer, and
customizing the interactive checklist for collaboration with at least one secondary user, including receiving input from the primary user to assign at least a subset of items from the interactive checklist to the at least one secondary user, and
a communication module for communicating electronically information regarding the at least a subset of items from the interactive checklist to the at least one secondary user, wherein the electronically communicated information at least includes a selectable option for the at least one secondary user to purchase any of the at least a subset of items from the interactive checklist.

7. The system according to claim 6 the instructions further comprising:
a notification module stored in the memory for notifying the primary user of the purchase of an item that is either not on the interactive checklist or that had been previously purchased; and
an acceptance module stored in the memory for enabling the primary user to either accept the item or to reject the item,
wherein accepting the item includes forwarding purchase information to a vendor to effect delivery of the item, and rejecting the item includes stopping the item from being shipped and granting the primary user cash or credit instead of the item.

8. The system of claim 6, wherein the selectable option directs the recipient directly from the electronically communicated information to a purchase screen.

9. The system of claim 8, wherein the purchase screen includes a shopping cart that displays the items for purchase.

10. The system of claim 6 wherein the primary user is enabled to purchase any checklist item through the interactive checklist.

* * * * *